United States Patent Office.

ORAZIO LUGO, OF BALTIMORE, MARYLAND.

Letters Patent No. 112,725, dated March 14, 1871.

IMPROVEMENT IN THE MANUFACTURE AND TREATMENT OF ALCOHOLIC SPIRITS.

The Schedule referred to in these Letters Patent and making part of the same.

Be it known that I, ORAZIO LUGO, of the city and county of Baltimore, State of Maryland, have invented certain Improvements in the Manufacture and Purification of Alcoholic Liquors or Spirits.

My invention consists—

First, in treating alcoholic liquids, (solutions containing hydrated oxide of ethyl,) such as high-wines, low-wines, whiskies, rums, molasses spirit, brandies, wine, beer, or fermented must or wort, with certain chemical reagents for the purpose of forming neutral compounds, oxidizing or removing the so-called fusil oils, (oil of brandy, oil of potato spirit, oil of corn or grain spirit, &c.;) and Second, in treating with certain chemical reagents any of the above-mentioned alcoholic liquids or spirits during the process of distillation at distilleries or rectifying establishments; and I, therefore, do hereby declare that the following is a correct specification thereof.

In order to enable those skilled in the science and art to apply my invention, I will proceed to describe one of the methods by which the desired result is obtained.

Spirituous or alcoholic liquids are generally obtained by a process called "vinous fermentation, by the decomposition which saccharine substances undergo, in contact with ferment and water, at certain temperatures.

During the so-called vinous fermentation other accidental fermentations and oxidations take place, giving rise to various kinds of alcohols, (fusil oils,) aldehydes, and acids; and when the fermented must or beer is submitted to distillation a considerable part of those accidental products are distilled and carried over with the alcohol proper.

The distillate thus obtained is called "raw spirit," and it consists chiefly of alcohol and water, with variable traces of impurities, as aldehydes, acids, fusil oil, and ethers. The nature and quantity of these impurities is dependent—

First, upon the quality of the saccharine substances used;

Second, upon the manner in which the vinous fermentation is conducted; and

Third, upon the construction of the distilling apparatus.

Under these and other conflicting circumstances will be perceived the practical impossibility of obtaining "clean spirits" by simple fractional distillation.

I have obtained very satisfactory results in treating raw spirits with reducing chemical reagents, intended to act especially on the aldehydes, ethers, and fusil oils, (amylic, propylic, butylic alcohols, &c.)

The oxidizing agents which I use are hypochlorous acid, (ClO,) sulphurous acid, ($SO_2$,) each in the form of a suitable salt, as hypochlorite (MO,ClO) and as sulphite or bisulphite, ($MO,SO_2$, or $MO,2SO_2$,)—the hypochlorites and sulphites of lime or of soda being preferred.

In order to illustrate how the practical operation is conducted, we will suppose that one thousand gallons of a spirituous liquid of specific gravity 0.9025 is to be treated. The spirit being in a suitable tank or vessel, about two gallons of a clear solution, for instance, of hypochlorite of lime, of about the specific gravity of 1.040, is added to the spirit, and the whole agitated for a few moments. Then, after an hour's time, about five gallons of a solution, for instance, of bisulphite of lime, of specific gravity 1.025, is added, and the whole again agitated. It will be observed that, after a few moments, a white flocculent precipitate is formed and the spirit has become odorless. If the spirit should give an acid reaction, a little milk of lime may be added.

The precipitate may be filtered off or the clear spirit decanted; or it may be distilled, when a very superior and clean spirit will be obtained.

It is impossible to give the precise proportions of the hypochlorites or sulphites to be used, for the reasons already stated, that the quantity and nature of the "impurities" (fusil oil, &c.) differ according to the quality of sugar used and the manner in which the spirit is manufactured.

Good results may be obtained, also, by treating the beer or must or wine before submitting the same to distillation, thus saving one distillation; but in this case, the chemicals used must be increased in strength and quantity, especially the sulphites or bisulphites.

This process of treating alcoholic spirits can also be used at the distilleries, during the process of distillation, by introducing the above-cited chemicals in a tank or vessel where the spirit is run into, connected with the "steam, must, or beer-still," a doubler and the cistern-room.

I do not limit myself to the specific gravity of the alcoholic liquid given above, nor simply to the solutions of hypochlorite of lime and of bisulphite of lime; but any of the suitable compounds of hypochlorous acid and of sulphurous acid, represented by the formula (MO,ClO) and of ($MO,SO_2$ and $MO,2SO_2$) as understood by chemists, may be used instead.

Any person skilled in the science will readily determine the required amount of the above-mentioned chemicals necessary to treat any given amount of spirituous liquids obtained from any known saccharine matter.

Having described my invention,

What I claim, and desire to secure by Letters Patent of the United States, is—

1. The process herein described, of treating alcoholic spirits or solutions containing alcohol, substantially as herein described, and for the purpose set forth, the same consisting in the purification and deodorization of high-wines, low-wines, whiskies, rums, brandies, wine, must, and fermented beer, by the use of the chemical agents herein mentioned.

2. The successive treatment of alcoholic spirits, first, by a compound of chlorine, and then by a compound of sulphur, as set forth.

3. The treatment of spirituous liquids with the herein-mentioned chemical agents during the process of distillation, substantially as herein described, and for the purpose set forth.

ORAZIO LUGO.

Witnesses:
A. L. HAYES,
F. W. RITTER, JR.